United States Patent
Ivanov et al.

(10) Patent No.: US 12,461,190 B2
(45) Date of Patent: Nov. 4, 2025

(54) GENERATION AND USE OF A REPOSITORY OF MOBILE APPARATUS IDENTIFIERS

(71) Applicant: HERE Global B.V., Eindhoven (NL)

(72) Inventors: Pavel Ivanov, Tampere (FI); Lauri Aarne Johannes Wirola, Tampere (FI); Marko Luomi, Tampere (FI); Henri Nurminen, Tampere (FI)

(73) Assignee: Here Global B.V., Eindhoven (NL)

( * ) Notice: Subject to any disclaimer, the term of this patent is extended or adjusted under 35 U.S.C. 154(b) by 347 days.

(21) Appl. No.: 18/336,500

(22) Filed: Jun. 16, 2023

(65) Prior Publication Data
US 2024/0418818 A1    Dec. 19, 2024

(51) Int. Cl.
*G01S 5/02*    (2010.01)

(52) U.S. Cl.
CPC ...... *G01S 5/02525* (2020.05); *G01S 5/02529* (2020.05)

(58) Field of Classification Search
CPC .................. G01S 5/02525; G01S 5/02529
USPC ....................................... 455/456.1
See application file for complete search history.

(56) References Cited

U.S. PATENT DOCUMENTS

| | | | |
|---|---|---|---|
| 10,536,356 B2 * | 1/2020 | Zhong ............... | H04L 43/045 |
| 11,770,400 B2 * | 9/2023 | Pandian ............. | H04W 12/088 |
| 2007/0010239 A1 * | 1/2007 | Connelly ............ | H04M 15/00 |
| | | | 455/423 |
| 2012/0028654 A1 * | 2/2012 | Gupta ................. | H04W 4/029 |
| | | | 455/456.3 |
| 2014/0171100 A1 | 6/2014 | Marti et al. | |
| 2016/0255158 A1 * | 9/2016 | Lowry ................. | H04L 67/146 |
| | | | 709/227 |
| 2016/0316034 A1 * | 10/2016 | Herrick ............... | H04L 67/146 |
| 2017/0164145 A1 * | 6/2017 | Lipman .............. | G06Q 30/0251 |
| 2017/0278133 A1 * | 9/2017 | Corrado ............. | H04L 12/4625 |
| 2018/0332558 A1 | 11/2018 | Chan et al. | |
| 2018/0367947 A1 | 12/2018 | Kim et al. | |
| 2019/0317947 A1 * | 10/2019 | Xu ...................... | G06F 11/3072 |

(Continued)

FOREIGN PATENT DOCUMENTS

| | | | | |
|---|---|---|---|---|
| JP | 2013025809 A | * | 2/2013 | ......... H04N 1/00973 |
| KR | 20140092788 A | | 7/2014 | |

(Continued)

OTHER PUBLICATIONS

Armengol et al., "Efficient Privacy-Preserving Fingerprint-Based Indoor Localization Using Crowdsourcing", 2015 IEEE 12th International Conference on Mobile Ad Hoc and Sensor Systems, (Oct. 19-22, 2015), 6 pages.

*Primary Examiner* — Mahendra R Patel
(74) *Attorney, Agent, or Firm* — Alston & Bird LLP

(57) ABSTRACT

An apparatus obtains a respective identifier communication from a respective mobile apparatus and extracts a respective network interface identifier from the respective identifier communication. The apparatus updates or generates a repository of mobile apparatus identifiers based on the respective network interface identifier. The apparatus filters observation data comprising one or more network interface identifiers based on the repository of mobile apparatus identifiers and/or provides the repository of mobile apparatus identifiers for use in filtering the observation data comprising one or more network interface identifiers.

14 Claims, 8 Drawing Sheets

(56) References Cited

U.S. PATENT DOCUMENTS

| | | | |
|---|---|---|---|
| 2020/0404610 A1* | 12/2020 | Crouch | G01S 5/0036 |
| 2022/0150216 A1* | 5/2022 | Zhang | H04W 48/16 |
| 2023/0354248 A1* | 11/2023 | Hirzallah | G01S 7/417 |

FOREIGN PATENT DOCUMENTS

| | | | | |
|---|---|---|---|---|
| WO | WO-2019060954 A1 * | 4/2019 | | G01S 5/0009 |
| WO | WO-2020025903 A1 * | 2/2020 | | G01S 5/02527 |
| WO | WO 2021/017987 A1 | 2/2021 | | |
| WO | WO-2021170502 A1 * | 9/2021 | | G01S 5/02 |

* cited by examiner

GENERATION AND USE OF A REPOSITORY OF MOBILE APPARATUS IDENTIFIERS

TECHNOLOGICAL FIELD

An example embodiment relates to generating a repository of mobile apparatus identifiers comprising network interface identifiers corresponding to mobile apparatuses. An example embodiment relates to using a repository of mobile apparatus identifiers to filter observation data.

BACKGROUND

Radio-based positioning compares observations of a radio environment captured by a mobile apparatus to a radio map. The radio map may be generated based on crowd-sourced observations of radio network access points and includes radio models of the respective coverage areas of the radio network access points. If the radio map includes radio models of mobile apparatuses that are not labelled as mobile apparatuses, the reliability of positioning performed using the radio map may be compromised.

BRIEF SUMMARY

Various embodiments provide methods, apparatus, systems, and computer program products for generating, updating, and/or using a repository of mobile apparatus identifiers. For example, the repository of mobile apparatus identifiers is generated and/or updated to include a plurality of network interface identifiers associated with mobile apparatuses. In various embodiments, the repository of mobile apparatus identifiers does not include any identifying information in association with the plurality of network interface identifiers.

For example, in various embodiments a mobile apparatus determines that it is a mobile apparatus and then generates and provides an identifier communication. Based on the identifier communication, a repository of mobile apparatus identifiers is generated and/or updated. For example, in an example embodiment, a network apparatus receives the identifier communication and extracts a network interface identifier therefrom. The network interface identifier is configured to identify the mobile apparatus on a wireless network. For example, in various embodiments, the network interface identifier is a media access control (MAC) address. A repository, list, or database of mobile apparatus identifiers is generated or updated to include the network interface identifier extracted from the identifier communication.

In various embodiments, the repository, list, or database of mobile apparatus identifiers is used to filter observation data (e.g., crowd-sourced observation data) when using the observation data to generate and/or update radio models. For example, a radio model may be generated and/or updated that models, describes, and/or characterizes the coverage area of a radio network access point. A radio map configured for use in radio-based positioning may be generated and/or updated by aggregating and/or combining a plurality of radio models for respective radio network access points.

In various embodiments, the repository, list, or database of mobile apparatus identifiers is used by a computing apparatus to filter observation data. For example, in an example embodiment, a computing apparatus may observe one or more radio network access points. The computing apparatus may filter the observed radio network access points into a list of mobile access points and a list of fixed location access points. The computing apparatus may then display the list of mobile access points and the list of fixed location access points via a display thereof such that a user may select an access point to use to access a radio network. For example, the computing apparatus may display of list of mobile hotspots and/or a list of permanent hotspots.

In an example embodiment, a network apparatus obtains a respective identifier communication from a respective mobile apparatus. The network apparatus extracts a respective network interface identifier from the respective identifier communication and updates and/or generates a repository of mobile apparatus identifiers based on the respective network interface identifier. The network apparatus filters observation data comprising one or more network interface identifiers based on the repository of mobile apparatus identifiers and/or provides the repository of mobile apparatus identifiers for use in filtering the observation data comprising one or more network interface identifiers.

In an example embodiment, a mobile apparatus accesses a network interface identifier configured to identify the mobile apparatus on a network. The network interface identifier is stored in a memory of the mobile apparatus. The mobile apparatus generates an identifier communication including the network interface identifier; and provides the identifier communication such that a network apparatus receives the identifier communication.

In an example embodiment, a computing apparatus captures observation data. The observation data includes one or more network interface identifiers of observed radio network access points. The computing apparatus obtains a repository of mobile apparatus identifiers; and filters the observation data based on the repository of mobile apparatus identifiers.

According to an aspect of the present disclosure, a method for generating/updating and/or using a repository of mobile apparatus identifiers is provided. In an example embodiment, the method comprises obtaining, by a network apparatus, a respective identifier communication from a respective mobile apparatus; extracting, by the network apparatus, a respective network interface identifier from the respective identifier communication; and updating or generating, by the network apparatus, a repository of mobile apparatus identifiers based on the respective network interface identifier. The method further comprises at least one of (a) filtering, by the network apparatus, observation data comprising one or more network interface identifiers based on the repository of mobile apparatus identifiers or (b) providing, by the network apparatus, the repository of mobile apparatus identifiers for use in filtering the observation data comprising one or more network interface identifiers.

In an example embodiment, the observed list of network interface identifiers is filtered to remove observation data corresponding to mobile devices therefrom.

In an example embodiment, the method further comprising updating a map based on filtered observations generated by filtering the observed list of network interface identifiers.

In an example embodiment, the map is a radio map comprising a plurality of access point models and the filtered observations include observation data corresponding to one or more fixed location access points.

In an example embodiment, the network interface identifier is a MAC address.

In an example embodiment, the identifier communication comprises the respective network interface identifier and an indication that the respective network interface identifier corresponds to a mobile apparatus.

In an example embodiment, the repository of mobile apparatus identifiers comprises a plurality of network interface identifiers corresponding to a plurality of mobile apparatuses.

In an example embodiment, the repository of mobile apparatus identifiers is updated to include the respective network interface identifier such that the respective network interface identifier is stored in the repository of mobile apparatus identifiers independent of any information that may identify a user of the respective mobile apparatus.

In an example embodiment, the repository of mobile apparatus identifiers is a data structure comprising a list of network interface identifiers corresponding to mobile apparatuses.

According to another aspect, an apparatus is provided. In an example embodiment, the apparatus comprises at least one processor and at least one memory storing computer program code and/or instructions. The at least one memory and the computer program code and/or instructions are configured to, with the processor, cause the apparatus to at least obtain a respective identifier communication from a respective mobile apparatus; extract a respective network interface identifier from the respective identifier communication; and update or generate a repository of mobile apparatus identifiers based on the respective network interface identifier. The at least one memory and the computer program code and/or instructions are configured to, with the processor, cause the apparatus to perform at least one of (a) filtering observation data comprising one or more network interface identifiers based on the repository of mobile apparatus identifiers or (b) providing the repository of mobile apparatus identifiers for use in filtering the observation data comprising one or more network interface identifiers.

In an example embodiment, the observed list of network interface identifiers is filtered to remove observation data corresponding to mobile devices therefrom.

In an example embodiment, the at least one memory and the computer program code and/or instructions are configured to, with the processor, cause the apparatus to at least update a map based on filtered observations generated by filtering the observed list of network interface identifiers.

In an example embodiment, the map is a radio map comprising a plurality of access point models and the filtered observations include observation data corresponding to one or more fixed location access points.

In an example embodiment, the network interface identifier is a MAC address.

In an example embodiment, the identifier communication comprises the respective network interface identifier and an indication that the respective network interface identifier corresponds to a mobile apparatus.

In an example embodiment, the repository of mobile apparatus identifiers comprises a plurality of network interface identifiers corresponding to a plurality of mobile apparatuses.

In an example embodiment, the repository of mobile apparatus identifiers is updated to include the respective network interface identifier such that the respective network interface identifier is stored in the repository of mobile apparatus identifiers independent of any information that may identify a user of the respective mobile apparatus.

In an example embodiment, the repository of mobile apparatus identifiers is a data structure comprising a list of network interface identifiers corresponding to mobile apparatuses.

According to another aspect, a computer program product is provided. In an example embodiment, the computer program product comprises at least one non-transitory computer-readable storage medium having computer-readable program code and/or instructions portions stored therein. The computer-readable program code and/or instructions portions comprise executable portions configured, when executed by a processor of an apparatus, to cause the apparatus to obtain a respective identifier communication from a respective mobile apparatus; extract a respective network interface identifier from the respective identifier communication; and update or generate a repository of mobile apparatus identifiers based on the respective network interface identifier. The computer-readable program code and/or instructions portions comprise executable portions configured, when executed by a processor of an apparatus, to cause the apparatus to perform at least one of (a) filtering observation data comprising one or more network interface identifiers based on the repository of mobile apparatus identifiers or (b) providing the repository of mobile apparatus identifiers for use in filtering the observation data comprising one or more network interface identifiers.

In an example embodiment, the observed list of network interface identifiers is filtered to remove observation data corresponding to mobile devices therefrom.

In an example embodiment, The computer-readable program code and/or instructions portions comprise executable portions configured, when executed by a processor of an apparatus, to cause the apparatus to update a map based on filtered observations generated by filtering the observed list of network interface identifiers.

In an example embodiment, the map is a radio map comprising a plurality of access point models and the filtered observations include observation data corresponding to one or more fixed location access points.

In an example embodiment, the network interface identifier is a MAC address.

In an example embodiment, the identifier communication comprises the respective network interface identifier and an indication that the respective network interface identifier corresponds to a mobile apparatus.

In an example embodiment, the repository of mobile apparatus identifiers comprises a plurality of network interface identifiers corresponding to a plurality of mobile apparatuses.

In an example embodiment, the repository of mobile apparatus identifiers is updated to include the respective network interface identifier such that the respective network interface identifier is stored in the repository of mobile apparatus identifiers independent of any information that may identify a user of the respective mobile apparatus.

In an example embodiment, the repository of mobile apparatus identifiers is a data structure comprising a list of network interface identifiers corresponding to mobile apparatuses.

According to yet another aspect, an apparatus is provided. In an example embodiment, the apparatus comprises means for receiving a respective identifier communication from a respective mobile apparatus. The apparatus comprises means for extracting a respective network interface identifier from the respective identifier communication. The apparatus comprises means for updating or generating a repository of mobile apparatus identifiers based on the respective network interface identifier. The apparatus comprises means for performing at least one of (a) filtering observation data comprising one or more network interface identifiers based on the repository of mobile apparatus identifiers or (b)

providing the repository of mobile apparatus identifiers for use in filtering the observation data comprising one or more network interface identifiers.

According to another aspect, a method is for providing an identifier communication is provided. In an example embodiment, the method comprises accessing, by a mobile apparatus, a network interface identifier configured to identify the mobile apparatus on a network, the network interface identifier stored in a memory of the mobile apparatus; generating, by the mobile apparatus, an identifier communication including the network interface identifier; and providing, by the mobile apparatus, the identifier communication such that a network apparatus receives the identifier communication.

In an example embodiment, the method further comprises, prior to providing the identifier communication, determining that the mobile apparatus is mobile.

In an example embodiment, determining that the mobile apparatus is mobile comprises accessing, from the memory of the mobile apparatus, model information corresponding to the mobile apparatus; and determining that the model information corresponds to an apparatus that is mobile.

In an example embodiment, determining that the model information corresponds to an apparatus that is mobile comprises comparing at least a portion of the model information to a model information repository.

In an example embodiment, determining that the mobile apparatus is mobile comprises analyzing two or more locations of the mobile apparatus and determining that the two or more locations satisfy a threshold distance criteria.

In an example embodiment, the method further comprises obtaining a repository of mobile apparatus identifiers; and filtering observation data comprising one or more network interface identifiers based on the repository of mobile apparatus identifiers.

In an example embodiment, the method further comprises causing display of a list of available wireless network access points based at least in part on the observation data that has been filtered based on the repository of mobile apparatus identifiers.

In an example embodiment, the method further comprises causing display of at least one of (a) a list of mobile network access points or (b) a list of fixed location network access points based on the observation data that has been filtered based on the repository of mobile apparatus identifiers.

According to another aspect, a mobile apparatus is provided. In an example embodiment, the mobile apparatus comprises at least one processor and at least one memory storing computer program code and/or instructions. The at least one memory and the computer program code and/or instructions are configured to, with the processor, cause the mobile apparatus to at least access a network interface identifier configured to identify the mobile apparatus on a network, the network interface identifier stored in a memory of the mobile apparatus; generate an identifier communication including the network interface identifier; and provide the identifier communication such that a network apparatus receives the identifier communication.

In an example embodiment, the at least one memory and the computer program code and/or instructions are configured to, with the processor, cause the mobile apparatus to at least, prior to providing the identifier communication, determine that the mobile apparatus is mobile.

In an example embodiment, determining that the mobile apparatus is mobile comprises accessing, from the memory of the mobile apparatus, model information corresponding to the mobile apparatus; and determining that the model information corresponds to an apparatus that is mobile.

In an example embodiment, determining that the model information corresponds to an apparatus that is mobile comprises comparing at least a portion of the model information to a model information repository.

In an example embodiment, determining that the mobile apparatus is mobile comprises analyzing two or more locations of the mobile apparatus and determining that the two or more locations satisfy a threshold distance criteria.

In an example embodiment, the at least one memory and the computer program code and/or instructions are configured to, with the processor, cause the apparatus to at least obtain a repository of mobile apparatus identifiers; and filter observation data comprising one or more network interface identifiers based on the repository of mobile apparatus identifiers.

In an example embodiment, the at least one memory and the computer program code and/or instructions are configured to, with the processor, cause the mobile apparatus to at least cause display of a list of available wireless network access points based at least in part on the observation data that has been filtered based on the repository of mobile apparatus identifiers.

In an example embodiment, the at least one memory and the computer program code and/or instructions are configured to, with the processor, cause the mobile apparatus to at least cause display of at least one of (a) a list of mobile network access points or (b) a list of fixed location network access points based on the observation data that has been filtered based on the repository of mobile apparatus identifiers.

According to another aspect, a computer program product is provided. In an example embodiment, the computer program product comprises at least one non-transitory computer-readable storage medium having computer-readable program code and/or instructions portions stored therein. The computer-readable program code and/or instructions portions comprise executable portions configured, when executed by a processor of an apparatus, to cause the apparatus to access a network interface identifier configured to identify the mobile apparatus on a network, the network interface identifier stored in a memory of the mobile apparatus; generate an identifier communication including the network interface identifier; and provide the identifier communication such that a network apparatus receives the identifier communication.

In an example embodiment, the computer-readable program code and/or instructions portions comprise executable portions configured, when executed by a processor of an apparatus, to cause the apparatus to, prior to providing the identifier communication, determine that the mobile apparatus is mobile.

In an example embodiment, determining that the mobile apparatus is mobile comprises accessing, from the memory of the mobile apparatus, model information corresponding to the mobile apparatus; and determining that the model information corresponds to an apparatus that is mobile.

In an example embodiment, determining that the model information corresponds to an apparatus that is mobile comprises comparing at least a portion of the model information to a model information repository.

In an example embodiment, determining that the mobile apparatus is mobile comprises analyzing two or more locations of the mobile apparatus and determining that the two or more locations satisfy a threshold distance criteria.

In an example embodiment, the computer-readable program code and/or instructions portions comprise executable portions configured, when executed by a processor of an apparatus, to cause the apparatus to obtain a repository of mobile apparatus identifiers; and filter observation data comprising one or more network interface identifiers based on the repository of mobile apparatus identifiers.

In an example embodiment, the computer-readable program code and/or instructions portions comprise executable portions configured, when executed by a processor of an apparatus, to cause the apparatus to cause display of a list of available wireless network access points based at least in part on the observation data that has been filtered based on the repository of mobile apparatus identifiers.

In an example embodiment, the computer-readable program code and/or instructions portions comprise executable portions configured, when executed by a processor of an apparatus, to cause the apparatus to cause display of at least one of (a) a list of mobile network access points or (b) a list of fixed location network access points based on the observation data that has been filtered based on the repository of mobile apparatus identifiers.

According to yet another aspect, an apparatus is provided. In an example embodiment, the apparatus comprises means for accessing a network interface identifier configured to identify the mobile apparatus on a network. The network interface identifier stored in a memory of the mobile apparatus. The apparatus comprises means for generating an identifier communication including the network interface identifier. The apparatus comprises means for providing the identifier communication such that a network apparatus receives the identifier communication.

According to still another aspect, a method performed by a computing apparatus for using a repository of mobile apparatus identifiers is provided. In an example embodiment, the method comprises capturing observation data, the observation data including one or more network interface identifiers of observed radio network access points; obtaining a repository of mobile apparatus identifiers; and filtering the observation data based on the repository of mobile apparatus identifiers.

In an example embodiment, the method further comprises causing display of a list of available wireless network access points via a display of the computing apparatus based at least in part on the observation data that has been filtered based on the repository of mobile apparatus identifiers.

In an example embodiment, the method further comprises causing the computing apparatus to display at least one of (a) a list of mobile network access points or (b) a list of fixed location network access points based on the observation data that has been filtered based on the repository of mobile apparatus identifiers via a display of the computing apparatus.

According to another aspect, a computing apparatus is provided. In an example embodiment, the computing apparatus comprises at least one processor, a display, and at least one memory storing computer program code and/or instructions. The at least one memory and the computer program code and/or instructions are configured to, with the processor, cause the computing apparatus to at least capture observation data, the observation data including one or more network interface identifiers of observed radio network access points; obtain a repository of mobile apparatus identifiers; and filter the observation data based on the repository of mobile apparatus identifiers.

In an example embodiment, the at least one memory and the computer program code and/or instructions are configured to, with the processor, cause the computing apparatus to at least cause display of a list of available wireless network access points via a display of the computing apparatus based at least in part on the observation data that has been filtered based on the repository of mobile apparatus identifiers.

In an example embodiment, the at least one memory and the computer program code and/or instructions are configured to, with the processor, cause the computing apparatus to at least cause the computing apparatus to display at least one of (a) a list of mobile network access points or (b) a list of fixed location network access points based on the observation data that has been filtered based on the repository of mobile apparatus identifiers via a display of the computing apparatus.

According to another aspect, a computer program product is provided. In an example embodiment, the computer program product comprises at least one non-transitory computer-readable storage medium having computer-readable program code and/or instructions portions stored therein. The computer-readable program code and/or instructions portions comprise executable portions configured, when executed by a processor of an apparatus, to cause the apparatus to capture observation data, the observation data including one or more network interface identifiers of observed radio network access points; obtain a repository of mobile apparatus identifiers; and filter the observation data based on the repository of mobile apparatus identifiers.

In an example embodiment, computer-readable program code and/or instructions portions comprise executable portions configured, when executed by a processor of an apparatus, to cause the apparatus to cause display of a list of available wireless network access points via a display of the computing apparatus based at least in part on the observation data that has been filtered based on the repository of mobile apparatus identifiers.

In an example embodiment, computer-readable program code and/or instructions portions comprise executable portions configured, when executed by a processor of an apparatus, to cause the apparatus to cause the computing apparatus to display at least one of (a) a list of mobile network access points or (b) a list of fixed location network access points based on the observation data that has been filtered based on the repository of mobile apparatus identifiers via a display of the computing apparatus.

According to yet another aspect, an apparatus is provided. In an example embodiment, the apparatus comprises means for capturing observation data, the observation data includes one or more network interface identifiers of observed radio network access points. The apparatus comprises means for obtaining a repository of mobile apparatus identifiers. The apparatus comprises means for filtering the observation data based on the repository of mobile apparatus identifiers.

BRIEF DESCRIPTION OF THE DRAWINGS

Figure 1:
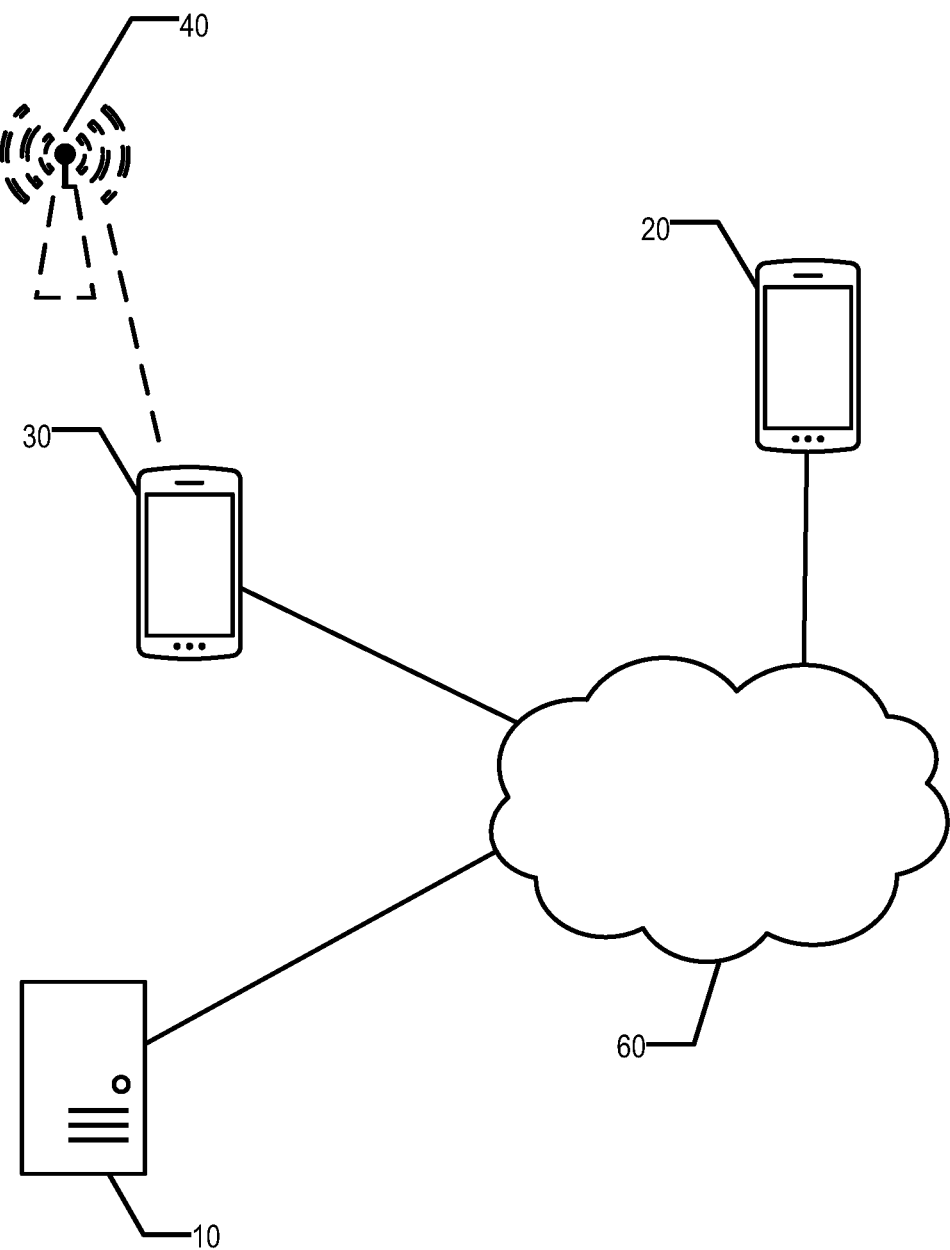
Figure 2A:
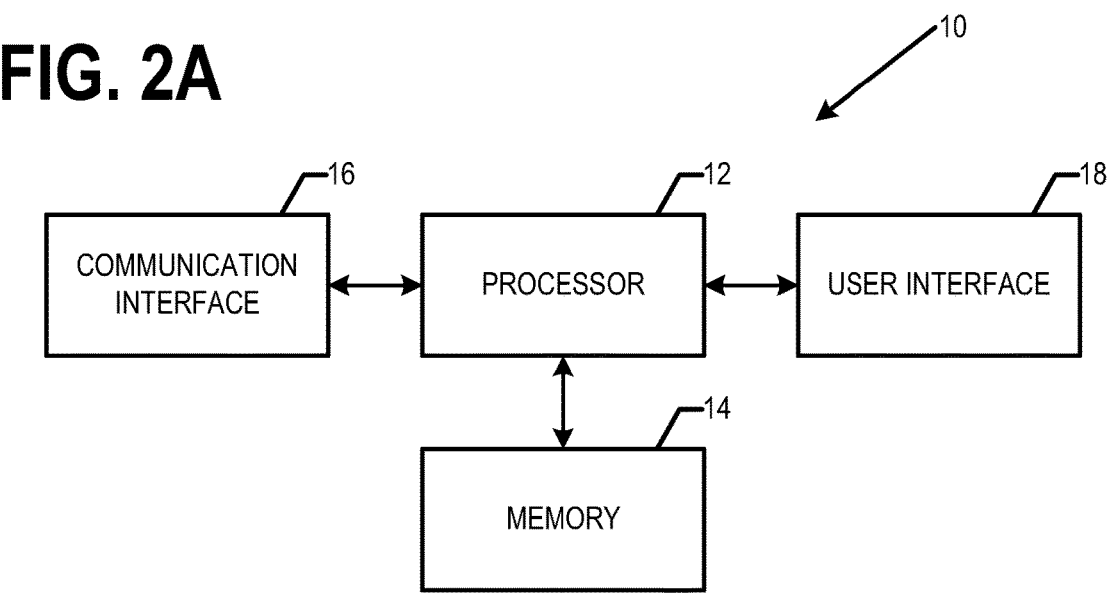
Figure 2B:
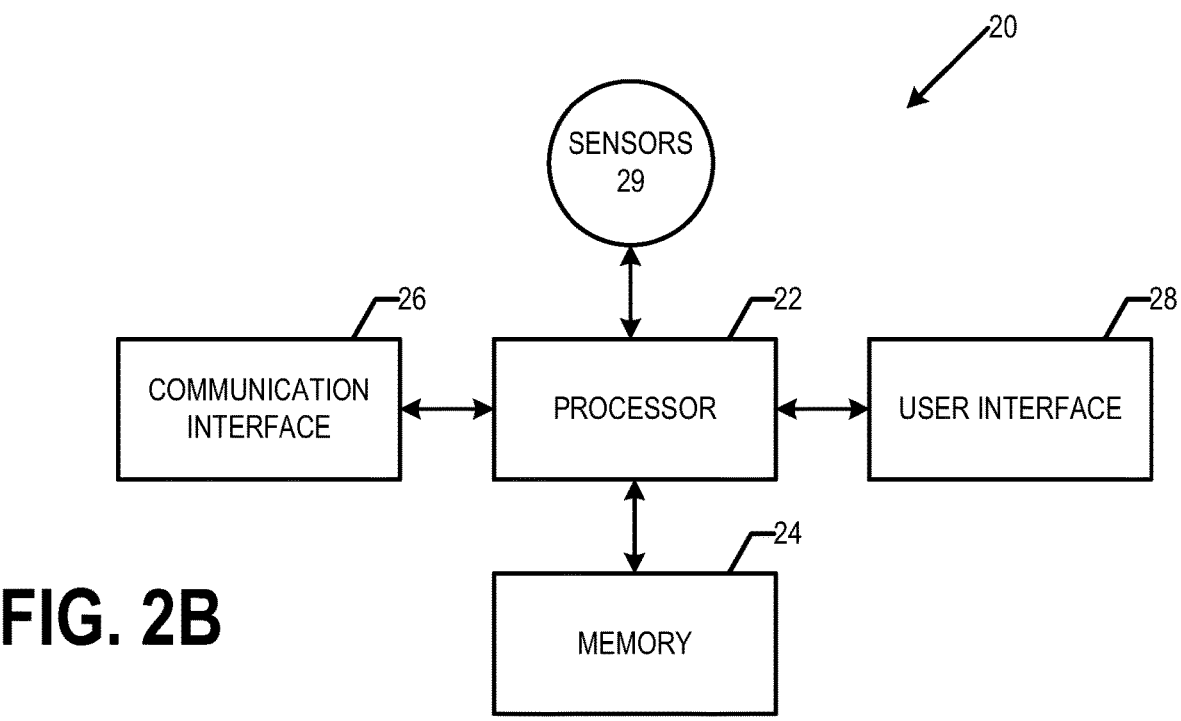
Figure 2C:
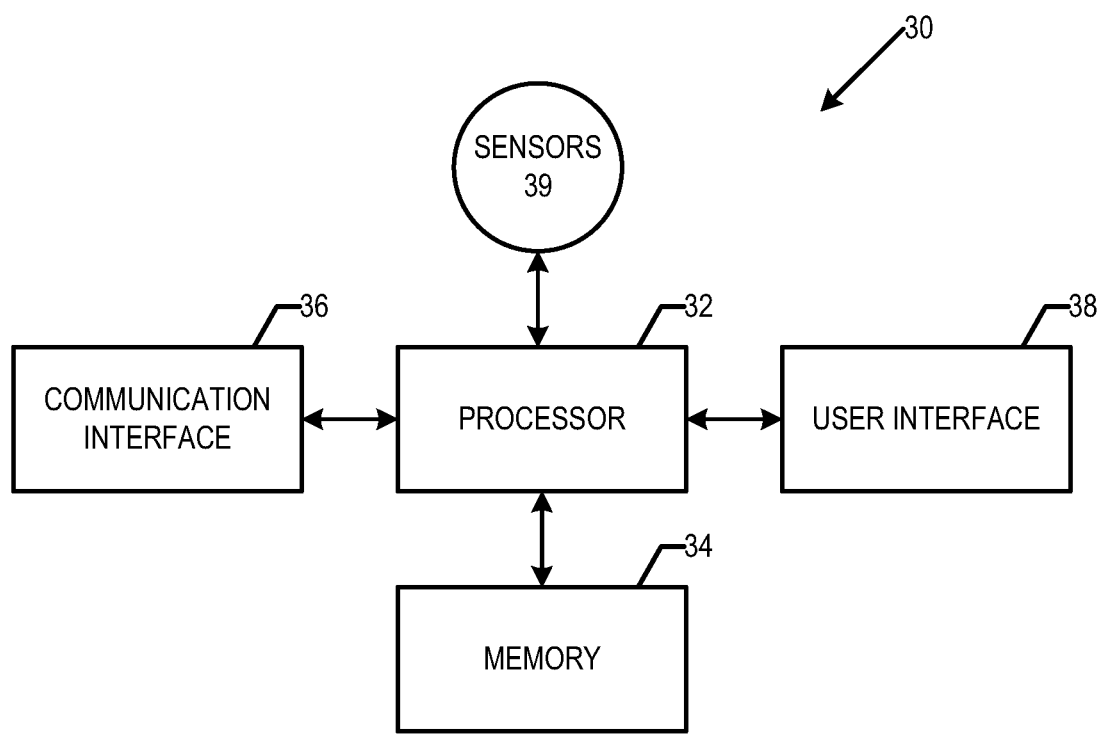
Figure 3:
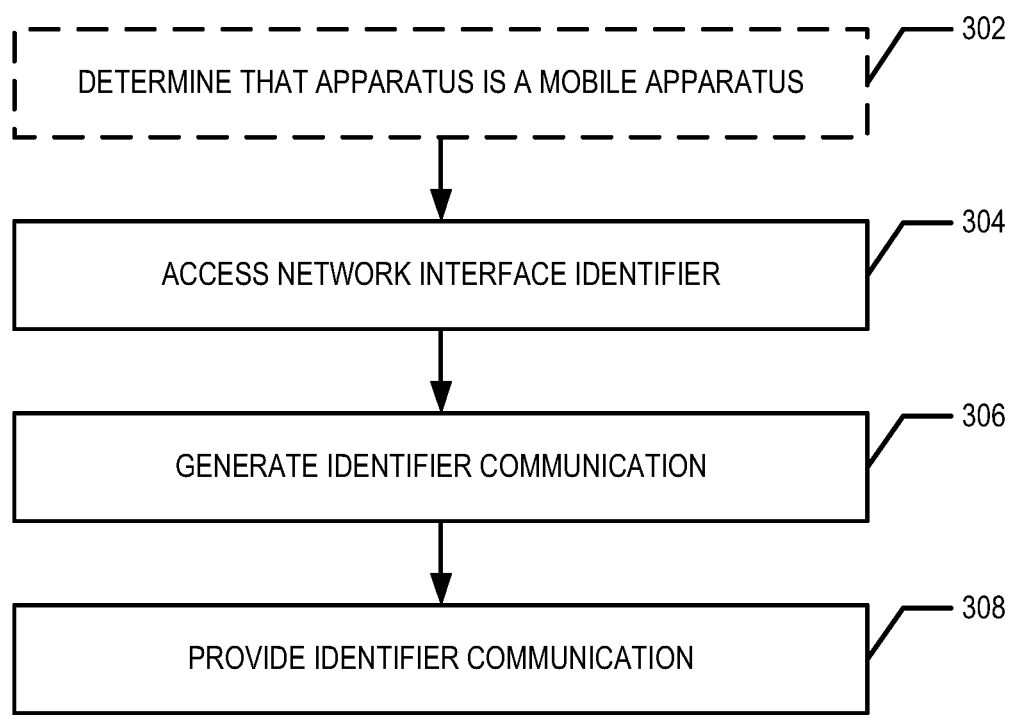
Figure 4:
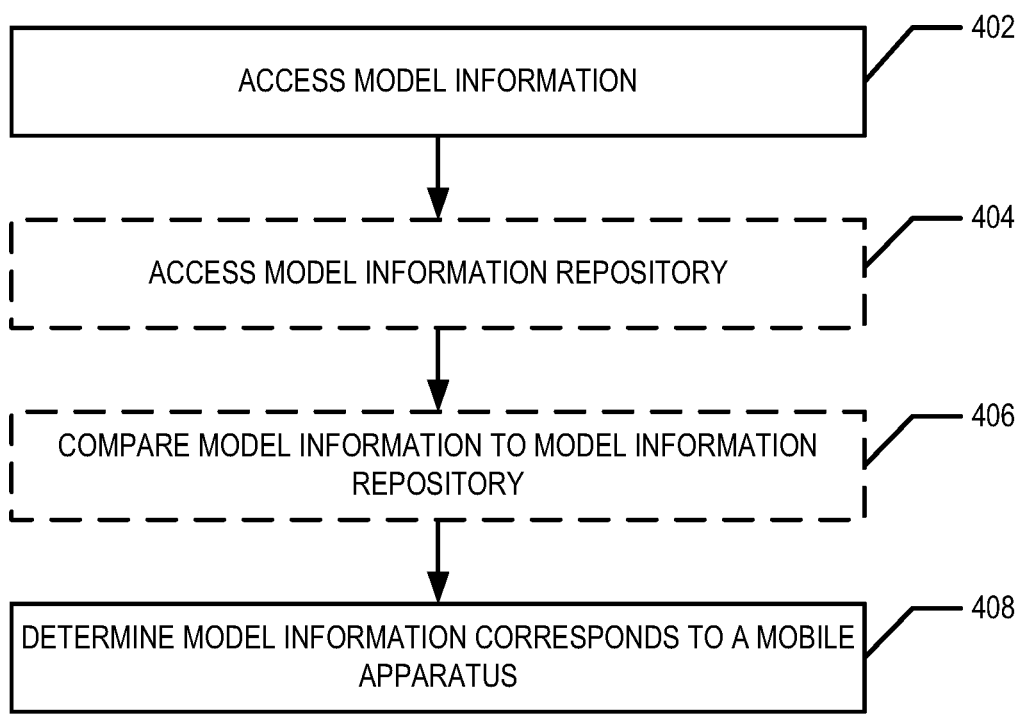
Figure 5:
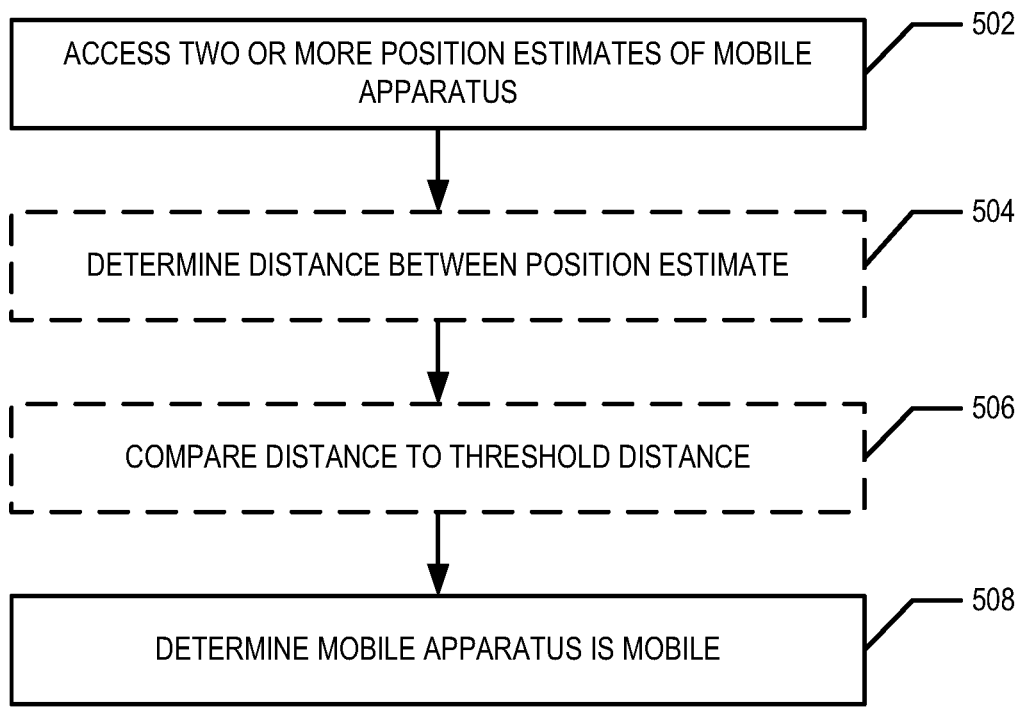
Figure 6:
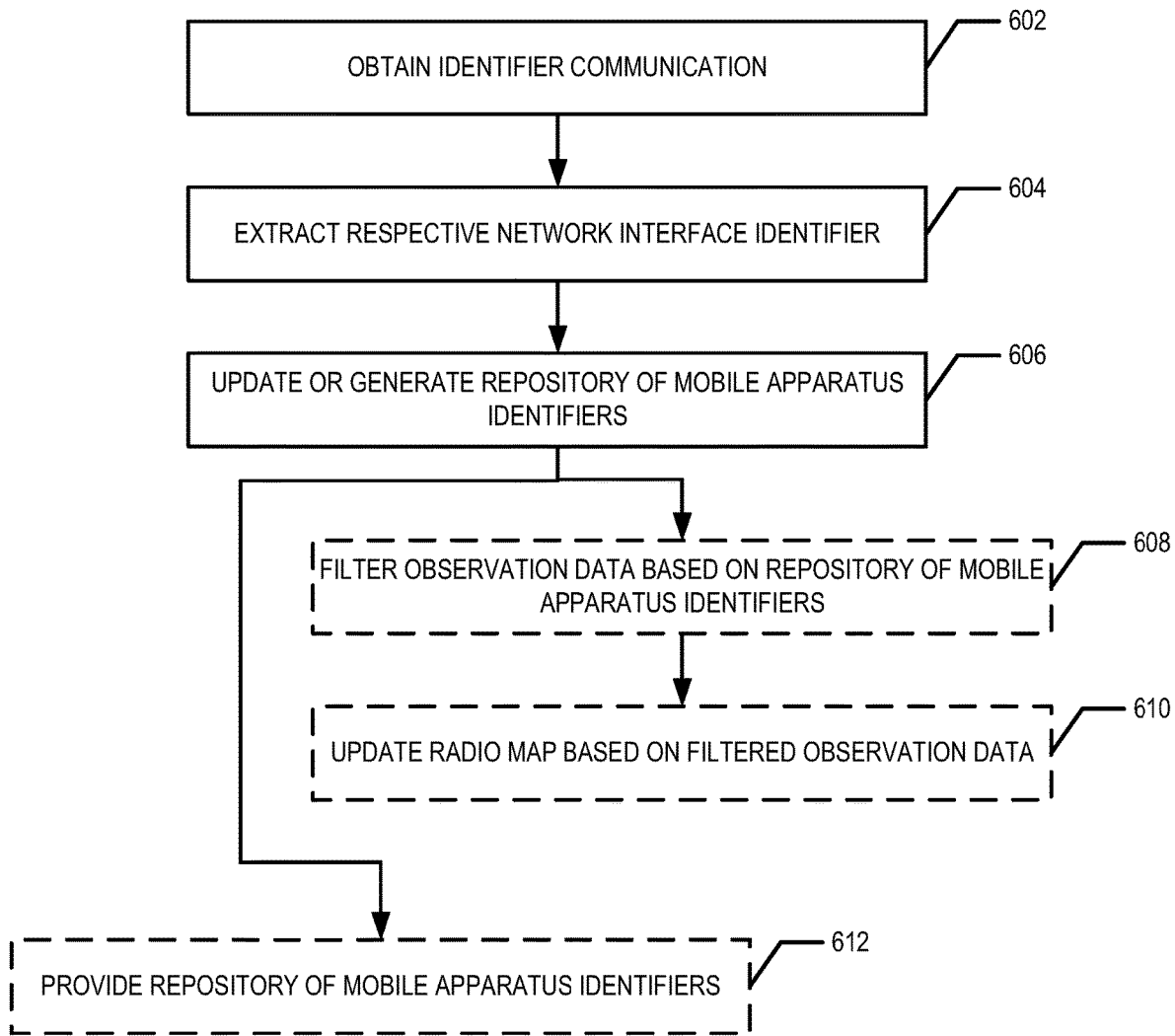
Figure 7:
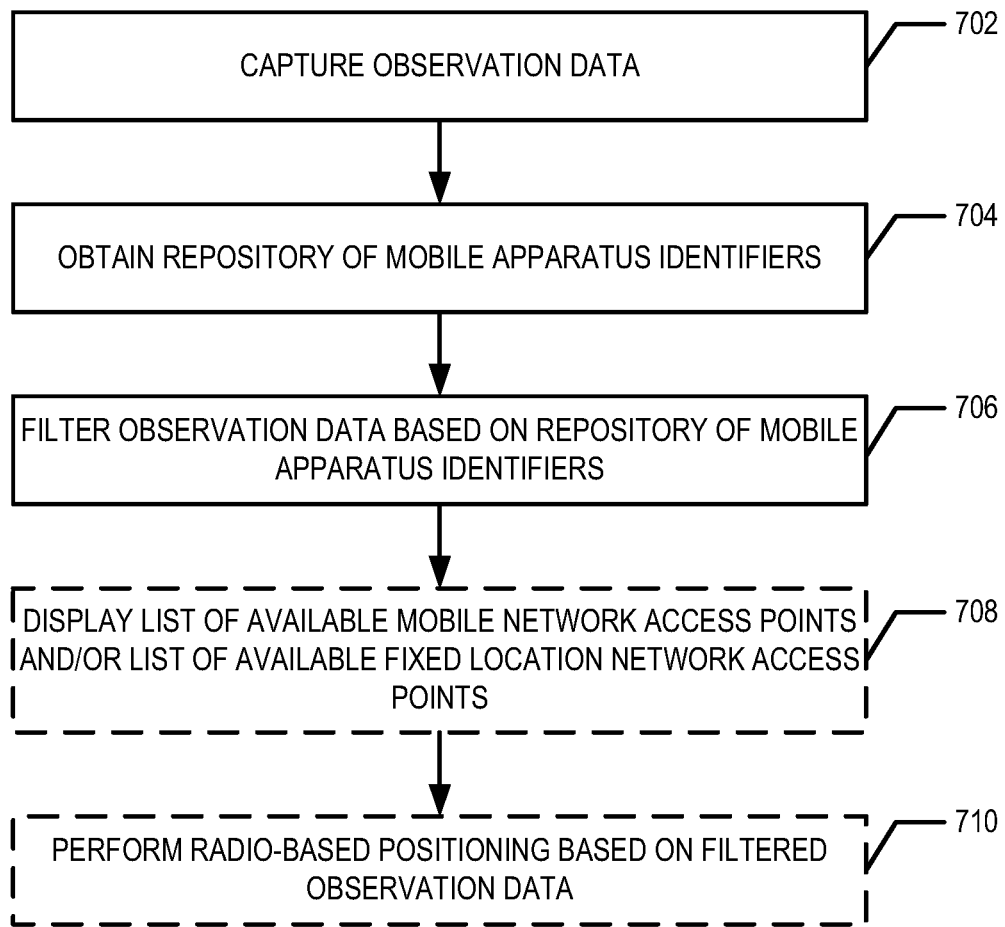

Having thus described certain example embodiments in general terms, reference will hereinafter be made to the accompanying drawings, which are not necessarily drawn to scale, and wherein:

FIG. 1 is a block diagram showing an example system of one embodiment of the present disclosure;

FIG. 2A is a block diagram of a network apparatus that may be specifically configured in accordance with an example embodiment;

FIG. 2B is a block diagram of a mobile apparatus that may be specifically configured in accordance with an example embodiment;

FIG. 2C is a block diagram of a computing apparatus that may be specifically configured in accordance with an example embodiment;

FIG. 3 is a flowchart illustrating operations performed, such as by the mobile apparatus of FIG. 2B, to provide an identifier communication, in accordance with an example embodiment;

FIG. 4 is a flowchart illustrating operations performed, such as by the mobile apparatus of FIG. 2B, to provide to determine that the mobile apparatus is mobile, in accordance with an example embodiment;

FIG. 5 is a flowchart illustrating operations performed, such as by the mobile apparatus of FIG. 2B, to provide to determine that the mobile apparatus is mobile, in accordance with another example embodiment;

FIG. 6 is a flowchart illustrating operations performed, such as by the network apparatus of FIG. 2A, to generate and use a repository of mobile apparatus identifiers, in accordance with an example embodiment; and FIG. 7 is a flowchart illustrating operations performed, such as by a computing apparatus of FIG. 2C, to use a repository of mobile apparatus identifiers, in accordance with an example embodiment.

DETAILED DESCRIPTION

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. The term "or" (also denoted "/") is used herein in both the alternative and conjunctive sense, unless otherwise indicated. The terms "illustrative" and "exemplary" are used to be examples with no indication of quality level. Like reference numerals refer to like elements throughout. As used herein, the terms "data," "content," "information," and similar terms may be used interchangeably to refer to data capable of being transmitted, received and/or stored in accordance with embodiments of the present invention. As used herein, the terms "substantially" and "approximately" refer to values and/or tolerances that are within manufacturing and/or engineering guidelines and/or limits. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware.

I. General Overview

Various embodiments provide methods, apparatus, systems, and computer program products for generating and/or using a repository of mobile apparatus identifiers. For example, in an example embodiment, repository of mobile apparatus identifiers is generated and used to prevent radio models corresponding to mobile apparatuses (e.g., mobile hotspots) from being used for radio-based positioning. In an example embodiment, the repository of mobile apparatus identifiers is used to filter observation data including radio network interface identifiers of radio network access points observed by a computing apparatus. In an example embodiment, mobile apparatuses self-report respective radio network interface identifiers and the respective radio network interface identifiers are compiled and/or aggregated into a repository of mobile apparatus identifiers.

Conventional techniques for updating a digital map based on crowd-sourced data include receiving instances of crowd-sourced data and updating a digital map based on the crowd-sourced data. However, the crowd-sourced data may include observations of radio network access points that are mobile. For example, a mobile apparatus, such as a mobile phone, may be used as a mobile hot spot. A computing apparatus configured to provide crowd-sourced data may observe the mobile hot spot and submit crowd-sourced data that includes observation data regarding observation of the mobile hot spot. A network apparatus may receive the crowd-sourced data that includes the observation regarding the observation of the mobile hot spot and update a radio map based on the crowd-sourced data. The radio map includes respective radio models (e.g., models of the respective radio coverage areas) of a plurality of radio network access points. However, the use of radio models corresponding to radio network access points that are mobile in performing radio-based positioning may cause the reliability and/or accuracy of the positioning to be decreased (e.g., compared to when no mobile network access points are included). Therefore, technical problems exist regarding generating radio maps for use with radio-based positioning techniques.

Moreover, when a user of a computing apparatus attempts to connect the computing apparatus to a radio network, the computing apparatus may display a list of observed radio network access points. If the list of observed radio network access points includes both mobile and fixed position radio network access points, the user may become confused regarding which radio network access point is the appropriate selection. Therefore, technical problems exist regarding display of information regarding radio network access points.

Various embodiments provide technical solutions to these technical problems. For example, mobile apparatuses may provide identifier communications which provide a radio network interface identifier associated with the mobile apparatus along with an indication that the provided radio network interface identifier is associated with a mobile apparatus. The identifier communication may be processed to extract the radio network interface identifier therefrom and the radio network interface identifier may be added to a repository of mobile apparatus identifiers. For example, the repository of mobile apparatus identifiers may be a list or database of radio network interface identifiers that are associated with mobile apparatuses. In various embodiments, the repository of mobile apparatus identifiers does not include identifying information corresponding to the mobile apparatuses other than the radio network interface identifiers. The repository of mobile apparatus identifiers can be used to filter the radio models included in a radio map and/or to mark radio models associated with mobile apparatuses as not to be used when performing radio-based positioning.

Thus, various embodiments provide improvements to the fields of radio map generation and radio-based positioning. The repository of mobile apparatus identifiers can be used to filter observation data such that available radio network access points may be provided as two different lists-a list of available mobile network access points and a list of fixed position radio network access points. Thus, various embodiments may enable display of available radio network access points in an improved, less confusing manner. Therefore various embodiments provide improved user experience and improved computer apparatus performance.

II. Example System Architecture

FIG. 1 provides an illustration of an example system that can be used in conjunction with various embodiments of the present invention. As shown in FIG. 1, the system includes one or more network apparatuses 10, one or more mobile apparatuses 20, one or more computing apparatuses 30, one or more networks 60, and/or the like. In an example embodiment, the system includes one or more radio network access points 40. In an example embodiment, the network apparatus 10 is a server, group of servers, distributed computing system, part of a cloud-based computing system, and/or other computing system. In various embodiments, a mobile apparatus 20 and/or a computing apparatus 30 is a smart phone, tablet, laptop, personal digital assistant (PDA), mobile computing device, navigation system, vehicle control system (e.g., ADAS or automated vehicle control system), mobile data gathering platform and/or the like. For example, in an example embodiment, the mobile apparatus 20 and/or computing apparatus 30 is a vehicle control system configured to autonomously drive a vehicle, assist in control of a vehicle, monitor various aspects of the vehicle (e.g., fault conditions, motor oil status, battery charge level, fuel tank fill level, and/or the like) and/or the like. In various embodiments, the mobile apparatus 20 and/or computing apparatus 30 is configured to autonomously drive a vehicle and may perform multiple functions that are similar to those performed by a mobile apparatus 20 and/or computing apparatus 30 configured to be an automated driver assistance system (ADAS) (e.g., lane keeping, lane change assistance, maintaining a lane, merging, etc.). In an example embodiment, a mobile apparatus 20 and/or computing apparatus 30 is configured to perform one or more positioning and/or navigation-related functions.

In various embodiments, the system further includes one or more radio network access points 40. In various embodiments, the radio network access points 40 are wireless network access points and/or gateways such as Wi-Fi network access points, cellular network access points, Bluetooth access points, and/or other radio frequency-based network access points. For example, in various embodiments, the mobile apparatuses 20 and/or computing apparatuses 30 capture observation data corresponding to observations of radio frequency signals emitted, transmitted, and/or broadcast by radio network access points 40 within the mobile apparatuses' 20 environment and/or proximity.

In various embodiments, the network apparatus 10 communicates with one or more mobile apparatuses 20 and/or computing apparatuses 30 via one or more wired or wireless networks 60. In various embodiments, a radio network access point 40 is a wireless access point that may be used by a mobile apparatus 20 and/or computing apparatus 30 to communicate with network 60. In various embodiments, a radio network access point 40 need not be an access point for accessing network 60.

In an example embodiment, a network apparatus 10 may comprise components similar to those shown in the example network apparatus 10 diagrammed in FIG. 2A. In an example embodiment, the network apparatus 10 is configured to receive identifier communications; generate and/or update a repository of mobile apparatus identifiers based on processing one or more identifier communications; provide or use the repository of mobile apparatus identifiers; update, store, and provide a radio map configured for use in performing radio-based positioning and/or navigation-related functions; and/or the like.

For example, as shown in FIG. 2A, the network apparatus 10 may comprise a processor 12, memory 14, a user interface 18, a communication interface 16, and/or other components configured to perform various operations, procedures, functions, or the like described herein. In various embodiments, the network apparatus 10 stores a geographical database, digital map, and/or positioning map, such as a radio map (e.g., a compilation and/or aggregation of respective radio models for a plurality of radio network access points, a radio environment and/or cellular network access point positioning map, and/or an access point registry); computer program code and/or instructions for performing various functions described herein; and/or the like (e.g., in memory 14), for example. In at least some example embodiments, the memory 14 is non-transitory.

In an example embodiment, the mobile apparatus 20 is configured to determine that it is a mobile apparatus, to generate and provide an identifier communication, and/or the like. In an example embodiment, a mobile apparatus 20 is configured and/or programmed for use as a radio network access point. In an example embodiment, the mobile apparatus 20 is a mobile computing device such as a smartphone, tablet, laptop, PDA, navigation system, vehicle control system, an Internet of things (IoT) device, and/or the like. In an example embodiment, as shown in FIG. 2B, the mobile apparatus 20 may comprise a processor 22, memory 24, a communication interface 26, a user interface 28, one or more sensors 29 and/or other components configured to perform various operations, procedures, functions or the like described herein. In various embodiments, the mobile apparatus 20 stores at least a portion of one or more digital maps (e.g., geographic databases, positioning maps, and/or the like) and/or computer executable instructions for generating and/or providing an identifier communication, and/or the like in memory 24. In at least some example embodiments, the memory 24 is non-transitory.

In various embodiments, the sensors 29 comprise one or more IMU sensors, one or more GNSS sensors, one or more radio sensors, and/or other sensors. In an example embodiment, the one or more IMU sensors comprise one or more accelerometers, gyroscopes, magnetometers, and/or the like. In various embodiments, the one or more GNSS sensor(s) are configured to communicate with one or more GNSS satellites and determine GNSS-based position estimates and/or other information based on the communication with the GNSS satellites. In various embodiments, the one or more radio sensors comprise one or more radio interfaces configured to observe and/or receive signals generated and/or transmitted by one or more access points and/or other computing entities (e.g., radio network access points 40). For example, the one or more interfaces may be configured (possibly in coordination with processor 22) to determine a locally unique identifier, globally unique identifier, and/or operational parameters of a radio network access point 40 observed by the radio sensor(s) (e.g., observed signal strength, round-trip time, timing advance, and/or the like). As used herein, a radio sensor observes a radio network access point 40 by receiving, capturing, measuring and/or observing a (radio frequency) signal generated and/or transmitted by the radio network access point 40. In an example embodiment, the interface of a radio sensor may be configured to observe one or more types of signals such as generated and/or transmitted in accordance with one or more protocols such as 5G, general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. For example, the interface of a radio sensor may be configured to observe signals of one or more modern global cellular formats such as GSM, WCDMA, TD-SCDMA, LTE, LTE-A, CDMA, NB-IoT and/or non-cellular formats such as WLAN, Bluetooth, Bluetooth Low Energy (BLE), Zigbee, Lora, and/or the like. For example, the interface(s) of the radio senor(s) may be configured to observe radio, millimeter, microwave, and/or infrared wavelength signals. In an example embodiment, the interface of radio sensor may be coupled to and/or part of a communication interface 26. In various embodiments, the sensors 29 may further comprise one or more image sensors configured to capture visual samples, such as digital camera(s), 3D cameras, 360° cameras, and/or image sensors. In various embodiments, the one or more sensors 29 may comprise various other sensors such as two dimensional (2D) and/or three dimensional (3D) light detection and ranging (LiDAR)(s), long, medium, and/or short range radio detection and ranging (RADAR), ultrasonic sensors, electromagnetic sensors, (near-) infrared (IR) cameras.

In an example embodiment, the computing apparatus 30 is configured to obtain a repository of mobile apparatus identifiers, filter observation data based on the repository of mobile apparatus identifiers, perform radio-based positioning using a radio map, and/or the like. In an example embodiment, the filtered observation data is used to provide a list of available and/or observed mobile network access points and/or a list of available and/or observed fixed location mobile network access points. In various embodiments, the filtered observation data and/or the radio map may be used to perform one or more positioning and/or navigation-related functions. Some non-limiting examples of positioning and/or navigation-related functions include providing a route or information corresponding to a geographic area (e.g., via a user interface), localization, localization visualization, route determination, lane level route determination, operating a vehicle along at least a portion of a route, operating a vehicle along at least a portion of a lane level route, route travel time determination, lane maintenance, route guidance, lane level route guidance, provision of traffic information/data, provision of lane level traffic information/data, vehicle trajectory determination and/or guidance, vehicle speed and/or handling control, route and/or maneuver visualization, and/or the like.

In an example embodiment, the computing apparatus 30 is a mobile computing device such as a smartphone, tablet, laptop, PDA, navigation system, vehicle control system, an Internet of things (IoT) device, and/or the like. In an example embodiment, a computing apparatus 30 is a mobile apparatus 20. In an example embodiment, as shown in FIG. 2C, the computing apparatus 30 may comprise a processor 32, memory 34, a communication interface 36, a user interface 38, one or more sensors 39 and/or other components configured to perform various operations, procedures, functions or the like described herein. In various embodiments, the computing apparatus 30 stores at least a portion of one or more digital maps (e.g., geographic databases, positioning maps, and/or the like), a repository of mobile apparatus identifiers, and/or computer executable instructions for generating and/or providing instances of crowd-sourced data, and/or the like in memory 34. In at least some example embodiments, the memory 34 is non-transitory.

In various embodiments, the sensors 39 comprise one or more IMU sensors, one or more GNSS sensors, one or more radio sensors, and/or other sensors. In an example embodiment, the one or more IMU sensors comprise one or more accelerometers, gyroscopes, magnetometers, and/or the like. In various embodiments, the one or more GNSS sensor(s) are configured to communicate with one or more GNSS satellites and determine GNSS-based position estimates and/or other information based on the communication with the GNSS satellites. In various embodiments, the one or more radio sensors comprise one or more radio interfaces configured to observe and/or receive signals generated and/or transmitted by one or more access points and/or other computing entities (e.g., radio network access points 40). For example, the one or more interfaces may be configured (possibly in coordination with processor 32) to determine a locally unique identifier, globally unique identifier, and/or operational parameters of a radio network access point 40 observed by the radio sensor(s) (e.g., observed signal strength, round-trip time, timing advance, and/or the like). As used herein, a radio sensor observes a radio network access point 40 by receiving, capturing, measuring and/or observing a (radio frequency) signal generated and/or transmitted by the radio network access point 40. In an example embodiment, the interface of a radio sensor may be configured to observe one or more types of signals such as generated and/or transmitted in accordance with one or more protocols such as 5G, general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR)

protocols, near field communication (NFC) protocols, Wibree, Bluetooth protocols, wireless universal serial bus (USB) protocols, and/or any other wireless protocol. For example, the interface of a radio sensor may be configured to observe signals of one or more modern global cellular formats such as GSM, WCDMA, TD-SCDMA, LTE, LTE-A, CDMA, NB-IoT and/or non-cellular formats such as WLAN, Bluetooth, Bluetooth Low Energy (BLE), Zigbee, Lora, and/or the like. For example, the interface(s) of the radio senor(s) may be configured to observe radio, millimeter, microwave, and/or infrared wavelength signals. In an example embodiment, the interface of radio sensor may be coupled to and/or part of a communication interface 26. In various embodiments, the sensors 29 may further comprise one or more image sensors configured to capture visual samples, such as digital camera(s), 3D cameras, 360° cameras, and/or image sensors. In various embodiments, the one or more sensors 29 may comprise various other sensors such as two dimensional (2D) and/or three dimensional (3D) light detection and ranging (LiDAR)(s), long, medium, and/or short range radio detection and ranging (RADAR), ultrasonic sensors, electromagnetic sensors, (near-) infrared (IR) cameras.

Each of the components of the system may be in electronic communication with, for example, one another over the same or different wireless or wired networks 60 including, for example, a wired or wireless Personal Area Network (PAN), Local Area Network (LAN), Metropolitan Area Network (MAN), Wide Area Network (WAN), cellular network, and/or the like. In an example embodiment, a network 60 comprises the automotive cloud, digital transportation infrastructure (DTI), radio data system (RDS)/high definition (HD) radio or other digital radio system, and/or the like. For example, a mobile apparatus 20 and/or computing apparatus 30 may be in communication with a network apparatus 10 via the network 60. For example, a mobile apparatus 20 and/or computing apparatus 30 may communicate with the network apparatus 10 via a network, such as the Cloud. For example, the Cloud may be a computer network that provides shared computer processing resources and data to computers and other devices connected thereto. For example, the mobile apparatus 20 generates an identifier communication and provides (e.g., transmits) the identifier communication such that the network apparatus 10 receives the identifier communication via the network 60. For example, the network apparatus 10 generates and/or updates a repository of mobile apparatus identifiers and provides (e.g., transmits) the repository of mobile apparatus identifiers such that the computing apparatus 30 receives the repository of mobile apparatus identifiers via the network 60.

Certain example embodiments of the network apparatus 10, mobile apparatus 20, and computing apparatus 30 are described in more detail below with respect to FIGS. 2A, 2B, and 2C.

III. Example Operation(s)

In various embodiments, a mobile apparatus 20 generates and provides an identifier communication. In various embodiments, the mobile apparatus 20 determines that it is mobile (e.g., does not have a fixed location) and, responsive thereto, generates and provides the identifier communication.

In various embodiments, a network apparatus 10 obtains (e.g., receives via communication interface 16 and/or accesses from memory 14) a plurality of identifier communications. The network apparatus 10 processes the identifier communications to extract respective radio network interface identifiers therefrom. The radio network interface identifiers are configured to communicate respective mobile apparatuses 20 via a respective radio network. For example, a radio network interface identifier is MAC address in an example embodiment. The network apparatus 10 compiles and/or aggregates the extracted radio network interface identifiers into a repository of mobile apparatus identifiers. The repository of mobile apparatus identifiers may be stored and updated based on the processing of additional identifier communications.

The repository of mobile apparatus identifiers may be used to filter observation data used to generate and/or update a radio map. For example, the radio map may be generated and/or updated to not include any radio models corresponding to mobile network interface identifiers. In another example, the radio map may be generated and/or updated such that any radio model corresponding to a mobile network interface identifier is labelled and/or marked as a mobile network access point or as not being for use in performing radio-based positioning. In another example, observation data for use in performing a radio-based positioning may be filtered based on the repository of mobile apparatus identifiers such that only information corresponding to observed fixed location network access points is used to perform the radio-based positioning. In another example, observation data may be filtered based on the repository of mobile apparatus identifiers such that a computing apparatus 30 may display a list of observed and/or available mobile network access points and/or a list of observed and/or available fixed location network access points.

Exemplary Operation of a Mobile Apparatus

FIG. 3 provides a flowchart illustrating various processes, procedures, and/or operations performed by a mobile apparatus 20. In various embodiments, a mobile apparatus 20 may perform the processes, procedures, and/or operations illustrated in FIG. 3 upon a first start-up and/or boot-up of the mobile apparatus, on each start-up and/or boot-up of the mobile apparatus, upon initialization and/or a first execution of a particular program (e.g., a crowd-sourcing client program and/or the like), periodically and/or regularly, and/or the like.

Starting at step 302, a mobile apparatus 20 determines that the mobile apparatus is mobile. For example, the mobile apparatus 20 comprises means, such as a processor 22, memory 24, communication interface 26, sensors 29, and/or the like, for determining that the mobile apparatus is mobile. For example, the mobile apparatus 20 may use a location history of the mobile apparatus, a list of mobile apparatus models, and/or the like to determine that the mobile apparatus 20 is mobile. In an example embodiment, if a mobile apparatus 20 were to determine that it was not mobile, the process would then stop.

At step 304, the mobile apparatus 20 accesses a network interface identifier corresponding to the mobile apparatus 20. For example, the mobile apparatus 20 comprises means, such as processor 22, memory 24, and/or the like for accessing the network interface identifier corresponding to the mobile apparatus 20. For example, the mobile apparatus 20 is associated with a network interface identifier. The network interface identifier is configured to identify the mobile apparatus 20 on a radio network. For example, in various embodiments, the network interface identifier is a MAC address and the radio network is a Wi-Fi network.

At step 306, the mobile apparatus 20 generates an identifier communication. For example, in various embodiments, the mobile apparatus 20 comprises means, such as processor 22, memory 24, and/or the like, for generating an identifier communication. In various embodiments, the identifier communication include the network interface identifier corresponding to the mobile apparatus 20 and an indication that the network interface identifier corresponds to a radio network access point that is mobile. In various embodiments, the identifier communication does not include identifying information (e.g., a location, a time stamp, etc.).

At step 308, the mobile apparatus 20 provides (e.g., transmits) the identifier communication. For example, the mobile apparatus 20 comprises means, such as processor 22, memory 24, communication interface 26, and/or the like, for providing (e.g., transmitting) the identifier communication. For example, the mobile apparatus 20 may provide the identifier communication such that a network apparatus 10 receives the identifier communication. In an example embodiment, the mobile apparatus 20 provides the identifier communication via one or more wired and/or wireless networks 60.

FIG. 4 provides a flowchart illustrating various processes, procedures, operations, and/or the like for determining that the mobile apparatus 20 is mobile, according to an example technique. For example, the processes, procedures, operations, and/or the like illustrated in FIG. 4 are performed during and/or as part of step 302, in an example embodiment.

Starting at step 402, the mobile apparatus 20 access model information corresponding to the mobile apparatus 20. For example, the mobile apparatus 20 may store in memory 24 a model number, model identifier, and/or the like configured to identify a model corresponding to the mobile apparatus 20. The processor 22 may access the model information from the memory 24. For example, the mobile apparatus 20 comprises means, such as processor 22, memory 24, and/or the like, for accessing model information corresponding to the mobile apparatus 20.

At step 404, the mobile apparatus 20 accesses a model information repository. For example, the mobile apparatus 20 comprises means, such as processor 22, memory 24, communication interface 26, and/or the like, for accessing a model information repository. In various embodiments, the model information repository includes model information for a plurality of models of apparatuses. In an example embodiment, the model information repository indicates whether each model for which model information is provided is configured to be mobile or configured to have a fixed location. In an example embodiment, the model information repository is a list of model numbers, model identifiers, and/or the that are configured to identify mobile models. For example, the model information repository may be a list of mobile models of apparatuses.

At step 406, the mobile apparatus 20 compares the model information corresponding to the mobile apparatus 20 to the model information repository. For example, the mobile apparatus 20 comprises means, such as processor 22, memory 24, and/or the like, for comparing the model information corresponding to the mobile apparatus 20 to the model information repository. For example, the mobile apparatus 20 may query the model information repository based on the model information corresponding to the mobile apparatus 20 to identify an entry in the model information repository corresponding to the mobile apparatus 20 or determine whether an entry exists in the model information repository corresponding to the mobile apparatus 20.

At step 408, the mobile apparatus 20 determines that the model information corresponding to the mobile apparatus 20 corresponds to a mobile model based at least in part on the result of comparing the model information corresponding to the mobile apparatus 20 to the model information repository. For example, the mobile apparatus 20 comprises means, such as processor 22, memory 24, and/or the like, for determining that the mobile information corresponds to a mobile model. For example, the mobile apparatus 20 may determine that the mobile apparatus 20 is mobile. For example, in an example embodiment where the model information repository is a list of mobile models, the mobile apparatus 20 may determine that the model information corresponding to the mobile apparatus 20 corresponds to a mobile model when the model information repository includes an entry that matches the model information. In another example, in an example embodiment where the model information repository includes information regarding mobile and fixed location models of apparatuses, the mobile apparatus 20 may determine that the model information corresponding to the mobile apparatus 20 corresponds to a mobile model responsive to determining that an entry in the model information repository that is indexed by a model number or model identifier that matches the model information corresponding to the mobile apparatus 20 indicates that the respective model is a mobile model.

FIG. 5 provides a flowchart illustrating various processes, procedures, operations, and/or the like for determining that the mobile apparatus 20 is mobile according to another example technique. For example, the processes, procedures, operations, and/or the like illustrated in FIG. 5 are performed during and/or as part of step 302, in an example embodiment.

Starting at step 502, the mobile apparatus 20 access two or more position estimates of the mobile apparatus 20. For example, the mobile apparatus 20 comprises means, such as processor 22, memory 24, and/or the like for determining two or more position estimates of the mobile apparatus 20. The two or more position estimates of the mobile apparatus 20 are locations where the mobile apparatus is currently located or has previously been located.

For example, the mobile apparatus 20 may be configured to regularly, periodically, and/or in a triggered manner determine a position estimate indicating the location of the mobile apparatus 20. For example, the mobile apparatus may use data captured by one or more sensors 29 (e.g., radio interface sensors, GNSS sensors, IMU sensors, imaging sensors, and/or other sensors) for determining a position estimate indicating a location of the mobile apparatus 20. The mobile apparatus 20 may then store at least some of the position estimates in memory 24. The mobile apparatus 20 may access two or more of the stored position estimates from the memory 24.

At step 504, the mobile apparatus 20 determines a distance between a position estimates. For example, the mobile apparatus 20 comprises means, such as processor 22, memory 24, and/or the like, for determining a distance between a pair of position estimates. In an example embodiment, the mobile apparatus 20 determines a respective distance for each pair of position estimates of the two or more position estimates. For example, if the two or more position estimates include Position A, Position B, and Position C, the mobile apparatus 20 determines a distance between Position A and Position B, a distance between Position B and Position C, and a distance between Position A and Position C. For example, in an example embodiment, each position estimate is a set of coordinates including a latitude, a longitude, and possibly an elevation and/or altitude. The distance between a pair of position estimates is determined as a straight-line or Euclidean distance, geodesic arc length, and/or the like. In various embodiments, the mobile apparatus 20 determines a largest distance of the respective distances between respective pairs of position estimates.

At step 506, the mobile apparatus 20 compares one or more distances (e.g., a largest distance) between respective pairs of position estimates to a threshold distance. For example, the mobile apparatus 20 comprises means, such as processor 22, memory 24, and/or the like, for comparing one or more distances (e.g., a largest distance) between respective pairs of position estimates to a threshold distance. In various embodiments, the threshold distance is greater than an uncertainty in the two or more position estimates. In various embodiments, the threshold distance is 100 meters, 250 meters, 500 meters, a kilometer, two kilometers, five kilometers, and/or the like. In an example embodiment, when the distance between a respective pair of position estimates is greater than the threshold distance, it is determined that a threshold requirement is satisfied. When the respective distances between all of the respective pairs of position estimates are less than the threshold distance, it is determined that the threshold requirement is not satisfied.

In an example embodiment, the mobile apparatus 20 determines a first distance between a first pair position estimates and the compares the first distance to the threshold distance. If the first distance is greater than the threshold distance, the process continues to step 508. If the first distance is not greater than the threshold distance, the mobile apparatus 20 determines a second distance between a second pair of position estimates and compares the second distance to the threshold distance. This continues until either a distance between a respective pair of position estimates is greater than the threshold distance or the respective distance between each pair of position estimates that were accessed at step 502 has been determined and compared to the threshold distance.

At step 508, the mobile apparatus 20 determines that the mobile apparatus 20 is mobile. For example, the mobile apparatus comprises means, such as processor 22, memory 24, and/or the like, for determining, based on a result of comparing the respective distances between one or more pairs of position estimates to the threshold distance, that the mobile apparatus is mobile. For example, if the distance between at least one pair of position estimates satisfies the threshold requirement (e.g., the distance between the pair of position estimates is larger than the threshold distance), the mobile apparatus 20 determines that the mobile apparatus 20 is mobile. In an example embodiment, if none of the respective distances between pairs of position estimates accessed at step 502 is larger than the threshold distance, it may be determined that the mobile apparatus 20 is not mobile.

Exemplary Operation of a Network Apparatus

In various embodiments, the network apparatus 10 is configured to generate and/or update a repository of mobile apparatus identifiers. In various embodiments, the network apparatus 10 may use a repository of mobile apparatus identifiers to filter observation data. The network apparatus 10 is configured, in various embodiments, to provide the repository of mobile apparatus identifiers such that a computing apparatus 30 receives the repository of mobile apparatus identifiers. For example, the computing apparatus 30 may use the repository of mobile apparatus identifiers to filter observation data.

FIG. 6 provides a flowchart illustrating various processes, procedures, and/or operations for generating and/or updating a repository of mobile apparatus identifiers and using the repository of mobile apparatus identifiers. Starting at step 602, the network apparatus 10 obtains one or more identifier communications. For example, the network apparatus 10 comprises means, such as processor 12, memory 14, communication interface 16, and/or the like, for obtaining one or more identifier communications. For example, the network apparatus 10 may access an identifier communication from memory 14, receive an identifier communication via the communication interface 16, and/or the like. In various embodiments, an identifier communication comprises a network interface identifier corresponding to a mobile apparatus 20 and an indication that the network interface identifier corresponds to an apparatus that is mobile.

At step 604, the network apparatus 10 processes the one or more identifier communications and extracts respective network interface identifiers therefrom. For example, the network apparatus 10 comprises means, such as processor 12, memory 14, and/or the like for processing an identifier communication and extracting a network interface identifier therefrom. For example, the network apparatus 10 may read the network interface identifier from an identifier communication.

At step 606, the network apparatus 10 generates and/or updates a repository of mobile apparatus identifiers. For example, in various embodiments, the network apparatus 10 comprises means, such as processor 12, memory 14, and/or the like, for generating and/or updating a repository of mobile apparatus identifiers. In various embodiments, the repository of mobile apparatus identifiers is a data object that includes one or more network interface identifiers corresponding to respective mobile apparatuses. For example, in an example embodiment, the repository of mobile apparatus identifiers is a list of network interface identifiers corresponding to mobile apparatuses 20. For example, the network apparatus 10 may add and/or write each of the network interface identifiers extracted and/or read from respective identifier communications to the repository of mobile apparatus identifiers. In various embodiments, the repository of mobile apparatus identifiers does not include any identifying information associated with the network interface identifiers. For example, in an example embodiment, the content of the repository of mobile apparatus identifiers consists of network interface identifiers. In various embodiments, the repository of mobile apparatus identifiers is stored in memory 14.

At step 608, the network apparatus 10 filters observation data based on the repository of mobile apparatus identifiers. For example, the network apparatus 10 comprises means, such as processor 12, memory 14, communication interface 16, and/or the like, for filtering observation data based on the repository of mobile apparatus identifiers. For example, the network apparatus 10 may obtain observation data captured and/or provided by one or more computing apparatus 30. For example, the network apparatus 10 may access the observation data from memory 14 and/or may receive the observation data via communication interface 16.

In various embodiments, the observation data corresponds to (e.g., includes and/or was determined based on) sensor data captured by one or more sensors 39 of the respective computing apparatus 30 and pertaining to one or more observable features in the environment of the respective computing apparatus 30, such as radio network access points. In an example embodiment, the observation data pertains to one or more observed radio network access points 40. For example, the observation data includes one or more network interface identifiers that each identify a respective radio network access point 40 observed by the computing apparatus 30, in various embodiments. In an example embodiment, the observation data further comprises information characterizing the respective observations of the one or more radio network access points 40 by the respective computing apparatus 30. For example, in an example embodiment, the observation data comprises a (received) signal strength indicator, a time parameter, and/or the like, each associated with a respective one of the one or more network interface identifiers. In various embodiments, the observation data may be associated with a position estimate indicating a location of the computing apparatus 30 when the computing apparatus captured the observation data.

In various embodiments, the network apparatus 10 filters the observation data based on the repository of mobile apparatus identifiers. For example, the network apparatus 10 may compare a network interface identifier of the observation data to the repository of mobile apparatus identifiers. If the network interface identifier from the observation data is present in the repository of mobile apparatus identifiers, the network apparatus 10 determines that the network interface identifier corresponds to a mobile network access point. In an example embodiment, if the network interface identifier is determined to correspond to a mobile network access point, the network apparatus 10 removes the information characterizing the observation the mobile network access point from the observation data for the sake of processing the observation data to generate or update a radio map. In an example embodiment if the network interface identifier is determined to correspond to a mobile network access point, the network apparatus 10 marks a radio model determined based at least in part on the information characterizing the observation the mobile network access point and/or associated with the network interface identifier determined to be present in the repository of mobile apparatuses as corresponding to a mobile apparatus and/or as not for use in performing radio-based positioning.

In an example embodiment, if a network interface identifier is not present in the repository of mobile apparatus identifiers, it is determined that the network interface identifier corresponds to a fixed location network access point. In an example embodiment, one or more other filtering steps may be performed. For example, in an example embodiment, the observation data may be further filtered to remove information characterizing observations associated with network interface identifiers that include a local administration bit.

At step 610, the network apparatus 10 updates a radio map based on the filtered observation data. For example, the network apparatus 10 comprises means, such as processor 12, memory 14, and/or the like, for updating a radio map based on the filtered observation data. For example, the network apparatus 10 may update one or more radio models of a radio map based on the filtered observation data. For example, information characterizing observations of fixed location (e.g., not mobile) radio network access points may be used to update radio models corresponding to the respective radio network access points. Any radio models present in the radio map that correspond to mobile network access points may be marked as corresponding to a mobile network access point and/or as not for use in performing radio-based positioning or may be removed from the radio map.

At step 612, the network apparatus 10 provides the repository of mobile apparatus identifiers. For example, the network apparatus 10 comprises means, such as processor 12, memory 14, communication interface 16, and/or the like, for providing the repository of mobile apparatus identifiers. For example, the network apparatus 10 may transmit the repository of mobile apparatus identifiers (e.g., via one or more wired and/or wireless networks 60) such that one or more computing apparatuses 30 receive the repository of mobile apparatus identifiers. In various embodiments, the one or more computing apparatuses 30 are configured to use the repository of mobile apparatus identifiers to filter observation data.

Example Operation of a Computing Apparatus

A computing apparatus 30 is configured to use a repository of mobile apparatus identifiers to filter observation data, in various embodiments. For example, a computing apparatus 30 is configured to capture observation data. The computing apparatus 30 may then filter the observation data based on the repository of mobile apparatus identifiers. For example, the computing apparatus 30 may filter the observation data based on the repository of mobile apparatus identifiers such that a radio-based positioning is performed on fixed location and/or non-mobile network access points 40. In another example, the computing apparatus 30 may filter the observation data based on the repository of mobile apparatus identifiers such that the computing apparatus 30 displays a list of observed and/or available mobile network access points and/or a list of observed and/or available fixed location network access points 40. FIG. 7 provides a flowchart illustrating various processes, procedures, operations, and/or the like performed by a computing apparatus 30.

Starting at step 702, the computing apparatus 30 captures observation data. For example, the computing apparatus 30 comprises means, such as processor 32, memory 34, sensors 39, and/or the like, for capturing observation data. In various embodiments, the observation data corresponds to (e.g., includes and/or was determined based on) sensor data captured by one or more sensors 39 of the computing apparatus 30 and pertaining to one or more observable features in the environment of the computing apparatus 30, such as radio network access points 40. In an example embodiment, the observation data pertains to one or more observed radio network access points 40. For example, the observation data includes one or more network interface identifiers that each identify a respective radio network access point 40 observed by the computing apparatus 30, in various embodiments. In an example embodiment, the observation data further comprises information characterizing the respective observations of the one or more radio network access points 40 by the respective computing apparatus 30. For example, in an example embodiment, the observation data comprises a (received) signal strength indicator, a time parameter, and/or the like, each associated with a respective one of the one or more network interface identifiers.

At step 704, the computing apparatus 30 obtains a repository of mobile apparatus identifiers. For example, the computing apparatus 30 comprises means, such as processor 32, memory 34, communication interface 36, and/or the like, for obtaining a repository of mobile apparatus identifiers. In an example embodiment, the computing apparatus 30 stores a repository of mobile apparatus identifiers in memory 34. In an example embodiment, the computing apparatus 30 receives a repository of mobile apparatus identifiers via a communication interface 36. For example, in an example embodiment, the network apparatus 10 provides (e.g., transmits) a repository of mobile apparatus identifiers such that a computing apparatus 30 receives the repository of mobile apparatus identifiers. In an example embodiment, the repository of mobile apparatus identifiers is a list of network interface identifiers that corresponds to respective mobile apparatuses and/or mobile network access points.

At step 706, the computing apparatus filters the observation data based on the repository of mobile apparatus identifiers. For example, the computing apparatus 30 comprises means, such as processor 32, memory 34, and/or the like, for filtering observation data based on the repository of mobile apparatus identifiers.

For example, the computing apparatus 30 may compare a network interface identifier of the observation data to the repository of mobile apparatus identifiers. If the network interface identifier from the observation data is present in the repository of mobile apparatus identifiers, the computing apparatus 30 determines that the network interface identifier corresponds to a mobile network access point. In an example embodiment, if the network interface identifier is determined to correspond to a mobile network access point, the computing apparatus 30 removes the information characterizing the observation the mobile network access point from the observation data for the sake of processing the observation data for performing a radio-based positioning. In an example embodiment, if the network interface identifier is determined to correspond to a mobile network access point, the computing apparatus 30 marks or labels the information characterizing the mobile network access point and/or the network interface identifier corresponding to the mobile network access point as corresponding to a radio network access point that is mobile.

In an example embodiment, if a network interface identifier is not present in the repository of mobile apparatus identifiers, it is determined that the network interface identifier corresponds to a fixed location network access point. In various embodiments, the information characterizing the observation of the fixed location network access point is processed to perform a radio-based positioning of the computing apparatus 30 and/or is marked and/or labeled as corresponding to a radio network access point that has a fix location. In an example embodiment, one or more other filtering steps may be performed. For example, in an example embodiment, the observation data may be further filtered to remove information characterizing observations associated with network interface identifiers that include a local administration bit.

At step 708, the computing apparatus 30 displays a list of observed and/or available mobile network access points and/or a list of observed and/or available fixed location network access points. For example, the computing apparatus 30 comprises means, such as processor 32, memory 34, user interface 38, and/or the like for displaying a list of observed and/or available mobile network access points and/or a list of observed and/or available fixed location network access points. For example, a user of the computing apparatus 30 may interact with the user interface 38 of the computing apparatus 30 to request a list of radio network access points available at the current location of the computing apparatus 30. The computing apparatus 30 may capture observation data that includes network interface identifiers for radio network access points available at and/or observable from the computing apparatus's 30 current location. The observation data may then be filtered based on the repository of mobile apparatus identifiers such that a list of observed and/or available mobile network access points and/or a list of observed and/or available fixed location network access points is displayed via the user interface 38. In an example embodiment, a user may select one of the radio network access points 40 displayed in the list of observed and/or available mobile network access points and/or the list of observed and/or available fixed location network access points to attempt to connect to the radio network via the selected radio network access point 40.

At step 710, the computing apparatus 30 may use the filtered observation data to perform a radio-based positioning. For example, the computing apparatus 30 may comprise means, such as processor 32, memory 34, communication interface 36, and/or the like, for using the filtered observation data to perform a radio-based positioning. For example, in an example embodiment, the computing apparatus 30 stores (e.g., in memory 34) at least a portion of a radio map. The computing apparatus 30 may use the portion of the observation data determined to correspond to fixed location and/or non-mobile network access points and the at least a portion of the radio map to perform the radio-based positioning. In an example embodiment, the computing apparatus 30 provides (e.g., transmits via communication interface 36) the filtered observation data (e.g., the portion of the observation data corresponding to fixed location and/or non-mobile network access points) such that a network apparatus 10 receives the filtered observation data. The network apparatus 10 may then use the filtered observation data to perform the radio-based positioning and may provide (e.g., transmit) the determined position estimate such that the computing apparatus 30 receives the position estimate (e.g., via communication interface 36).

IV. Technical Advantages

Conventional techniques for updating a digital map based on crowd-sourced data include receiving instances of crowd-sourced data and updating a digital map based on the crowd-sourced data. However, the crowd-sourced data may include observations of radio network access points that are mobile. For example, a mobile apparatus, such as a mobile phone, may be used as a mobile hot spot. A computing apparatus configured to provide crowd-sourced data may observe the mobile hot spot and submit crowd-sourced data that includes observation data regarding observation of the mobile hot spot. A network apparatus may receive the crowd-sourced data that includes the observation regarding the observation of the mobile hot spot and update a radio map based on the crowd-sourced data. The radio map includes respective radio models (e.g., models of the respective radio coverage areas) of a plurality of radio network access points. However, the use of radio models corresponding to radio network access points that are mobile in performing radio-based positioning may cause the reliability and/or accuracy of the positioning to be decreased (e.g., compared to when no mobile network access points are included). Therefore, technical problems exist regarding generating radio maps for use with radio-based positioning techniques.

Moreover, when a user of a computing apparatus attempts to connect the computing apparatus to a radio network, the computing apparatus may display a list of observed radio network access points. If the list of observed radio network access points includes both mobile and fixed position radio network access points, the user may become confused regarding which radio network access point is the appropriate selection. Therefore, technical problems exist regarding display of information regarding radio network access points.

Various embodiments provide technical solutions to these technical problems. For example, mobile apparatuses may provide identifier communications which provide a radio network interface identifier associated with the mobile apparatus along with an indication that the provided radio network interface identifier is associated with a mobile apparatus. The identifier communication may be processed to extract the radio network interface identifier therefrom and the radio network interface identifier may be added to a repository of mobile apparatus identifiers. For example, the repository of mobile apparatus identifiers may be a list or database of radio network interface identifiers that are associated with mobile apparatuses. In various embodiments, the repository of mobile apparatus identifiers does not include identifying information corresponding to the mobile apparatuses other than the radio network interface identifiers. The repository of mobile apparatus identifiers can be used to filter the radio models included in a radio map and/or to mark radio models associated with mobile apparatuses as not to be used when performing radio-based positioning.

Thus, various embodiments provide improvements to the fields of radio map generation and radio-based positioning. The repository of mobile apparatus identifiers can be used to filter observation data such that available radio network access points may be provided as two different lists—a list of available mobile network access points and a list of fixed position radio network access points. Thus, various embodiments may enable display of available radio network access points in an improved, less confusing manner. Therefore various embodiments provide improved user experience and improved computer apparatus performance.

V. Example Apparatus

The network apparatus 10, mobile apparatus 20, and/or computing apparatus 30 of an example embodiment may be embodied by or associated with a variety of computing devices including, for example, a navigation system including a global navigation satellite system (GNSS), a cellular telephone, a mobile phone, a personal digital assistant (PDA), a watch, a camera, a computer, an Internet of things (IoT) item, and/or other device that can observe an environment (e.g., a radio environment such as radio frequency signals from radio network access points 40, and/or the like) in the vicinity of the computing device. Additionally or alternatively, the network apparatus 10, mobile apparatus 20, and/or computing apparatus 30 may be embodied in other types of computing devices, such as a server, a personal computer, a computer workstation, a laptop computer, a plurality of networked computing devices or the like, that are configured to capture and provide instances of crowd-sourced data, update map data based on instances of crowd-sourced data, and/or the like. In an example embodiment, a mobile apparatus 20 and/or a computing apparatus 30 is a smartphone, tablet, laptop, PDA, and/or other mobile computing device and a network apparatus 10 is a server that may be part of a Cloud-based computing asset and/or processing system.

In some embodiments, the processor 12, 22, 32 (and/or co-processors or any other processing circuitry assisting or otherwise associated with the processor) may be in communication with the memory device 14, 24, 34 via a bus for passing information among components of the apparatus. The memory device may be non-transitory and may include, for example, one or more volatile and/or non-volatile memories. In other words, for example, the memory device may be an electronic storage device (e.g., a non-transitory computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As described above, the network apparatus 10, mobile apparatus 20, and/or computing apparatus 30 may be embodied by a computing entity and/or device. However, in some embodiments, the network apparatus 10, mobile apparatus 20, and/or computing apparatus 30 may be embodied as a chip or chip set. In other words, the network apparatus 10, mobile apparatus 20, and/or computing apparatus 30 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 12, 22, 32 may be embodied in a number of different ways. For example, the processor 12, 22, 32 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 12, 22, 32 may include one or more processing cores configured to perform independently. A multi-core processor may enable multiprocessing within a single physical package. Additionally or alternatively, the processor 12, 22, 32 may include one or more processors configured in tandem via the bus to enable independent execution of instructions, pipelining and/or multithreading.

In an example embodiment, the processor 12, 22, 32 may be configured to execute instructions stored in the memory device 14, 24, 34 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In some embodiments, the network apparatus 10, mobile apparatus 20, and/or computing apparatus 30 may include a user interface 18, 28, 38 that may, in turn, be in communication with the processor 12, 22, 32 to provide output to the user, such as one or more navigable routes to a destination location and/or from an origin location, display of location dependent and/or triggered information, and/or the like, and, in some embodiments, to receive an indication of a user input. As such, the user interface 18, 28, 38 may include one or more output devices such as a display, speaker, and/or the like and, in some embodiments, may also include one or more input devices such as a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor 12, 22, 32 (e.g., memory device 14, 24, 34 and/or the like).

The network apparatus 10, mobile apparatus 20, and/or computing apparatus 30 may optionally include a communication interface 16, 26, 36. The communication interface 16, 26, 36 may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In various embodiments, a network apparatus 10, mobile apparatus 20, and/or computing apparatus 30 may comprise a component (e.g., memory 14, 24, 34, and/or another component) that stores a digital map (e.g., in the form of a geographic database) comprising a first plurality of data records, each of the first plurality of data records representing a corresponding traversable map element (TME). At least some of said first plurality of data records map information/data indicate current traffic conditions along the corresponding TME. For example, the geographic database may include a variety of data (e.g., map information/data) utilized in various navigation functions such as constructing a route or navigation path, determining the time to traverse the route or navigation path, matching a geolocation (e.g., a GNSS determined location, a radio-based position estimate) to a point on a map, a lane of a lane network, and/or link, one or more localization features and a corresponding location of each localization feature, and/or the like. For example, the geographic database may comprise a positioning map comprising an access point registry and/or instances of network access point information corresponding to various network access points. For example, a geographic database may include road segment, segment, link, lane segment, or TME data records, point of interest (POI) data records, localization feature data records, and other data records. More, fewer or different data records can be provided. In one embodiment, the other data records include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GNSS data associations (such as using known or future map matching or geo-coding techniques), for example. In an example embodiment, the data records may comprise nodes, connection information/data, intersection data records, link data records, POI data records, and/or other data records. In an example embodiment, the network apparatus 10 may be configured to modify, update, and/or the like one or more data records of the geographic database. For example, the network apparatus 10 may modify, update, generate, and/or the like map information/data corresponding to TMEs, links, lanes, road segments, travel lanes of road segments, nodes, intersection, pedestrian walkways, elevators, staircases, radio network access points 40 or other observable features, and/or the like and/or the corresponding data records (e.g., to add or update updated map information/data including, for example, current traffic conditions along a corresponding TME; assign and/or associate an access point with a TME, lateral side of a TME, and/or representation of a building; and/or the like), a localization layer (e.g., comprising localization features), a registry of access points to identify mobile access points, and/or the corresponding data records, and/or the like.

In an example embodiment, the TME data records are links, lanes, or segments (e.g., maneuvers of a maneuver graph, representing roads, travel lanes of roads, streets, paths, navigable aerial route segments, and/or the like as can be used in the calculated route or recorded route information for determination of one or more personalized routes). The intersection data records are ending points corresponding to the respective links, lanes, or segments of the TME data records. The TME data records and the intersection data records represent a road network and/or other traversable network, such as used by vehicles, cars, bicycles, and/or other entities. Alternatively, the geographic database can contain path segment and intersection data records or nodes and connection information/data or other data that represent pedestrian paths or areas in addition to or instead of the vehicle road record data, for example. Alternatively and/or additionally, the geographic database can contain navigable aerial route segments or nodes and connection information/data or other data that represent an navigable aerial network, for example.

The TMEs, lane/road/link/path segments, segments, intersections, and/or nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database can include data about the POIs and their respective locations in the POI data records. The geographic database can also include data about places, such as cities, towns, or other communities, and other geographic features, such as bodies of water, mountain ranges, etc. Such place or feature data can be part of the POI data or can be associated with POIs or POI data records (such as a data point used for displaying or representing a position of a city). In addition, the geographic database can include and/or be associated with event data (e.g., traffic incidents, constructions, scheduled events, unscheduled events, etc.) associated with the POI data records or other records of the geographic database.

In various embodiments, the digital map is and/or comprises a radio map. The radio map is configured to describe the radio environment at various points within a corresponding geographical area and/or region. Fore example, the radio map may comprise a plurality of radio models where each radio model models, describes, and/or characterizes a respective coverage area of a respective radio network access point. In various embodiments, the radio models of the radio map are generated and/or updated based on crowd-sourced data, such as observation data and/or radio fingerprints, provided by various mobile apparatuses 20 and/or computing apparatuses 30. For example, a radio map may be stored as part of a geographic database.

The geographic database can be maintained by the content provider (e.g., a map developer) in association with the services platform. By way of example, the map developer can collect geographic data to generate and enhance the geographic database. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions. The navigation-related functions can correspond to vehicle navigation or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

VI. Apparatus, Methods, and Computer Program Products

As described above, FIGS. 3, 4, 5, 6, and 7 illustrate flowcharts of a network apparatus 10, mobile apparatus 20, and/or computing apparatus 30, methods, and computer program products according to an example embodiment of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 14, 24, 34 of an apparatus employing an embodiment of the present invention and executed by the processor 12, 22, 32 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims.

Although specific terms are employed herein, they are used in a generic and descriptive sense only and not for purposes of limitation.

The invention claimed is:

1. A method comprising:
   obtaining, by a network apparatus, a respective identifier communication from a respective mobile apparatus;
   extracting, by the network apparatus, a respective network interface identifier from the respective identifier communication;
   updating or generating, by the network apparatus, a repository of mobile apparatus identifiers based on the respective network interface identifier;
   at least one of (a) filtering, by the network apparatus, observation data comprising one or more network interface identifiers based on the repository of mobile apparatus identifiers or (b) providing, by the network apparatus, the repository of mobile apparatus identifiers for use in filtering the observation data comprising one or more network interface identifiers; and
   updating a map based on filtered observations generated by filtering the observation data, wherein the map is a radio map comprising a plurality of access point models and the filtered observations include observation data corresponding to one or more fixed location access points.

2. The method of claim 1, wherein the observation data is filtered to remove observation data corresponding to mobile devices therefrom.

3. The method of claim 1 wherein the network interface identifier is a MAC address.

4. The method of claim 1, wherein the identifier communication comprises the respective network interface identifier and an indication that the respective network interface identifier corresponds to a mobile apparatus.

5. The method of claim 1, wherein the repository of mobile apparatus identifiers comprises a plurality of network interface identifiers corresponding to a plurality of mobile apparatuses.

6. The method of claim 1, wherein the repository of mobile apparatus identifiers is updated to include the respective network interface identifier such that the respective network interface identifier is stored in the repository of mobile apparatus identifiers independent of any information that may identify a user of the respective mobile apparatus.

7. The method of claim 1, wherein the repository of mobile apparatus identifiers is a data structure comprising a list of network interface identifiers corresponding to mobile apparatuses.

8. A method comprising:
   accessing, by a mobile apparatus, a network interface identifier configured to identify the mobile apparatus on a network, the network interface identifier stored in a memory of the mobile apparatus;
   generating, by the mobile apparatus, an identifier communication including the network interface identifier;
   providing, by the mobile apparatus, the identifier communication such that a network apparatus receives the identifier communication;
   obtaining a repository of mobile apparatus identifiers;
   filtering observation data comprising one or more network interface identifiers based on the repository of mobile apparatus identifiers to generate filtered observation data;
   updating a map based on the filtered observation data, wherein the map is a radio map comprising a plurality of access point models and the filtered observation data includes observation data corresponding to one or more fixed location access points; and
   causing display of at least one of (a) a list of mobile network access points or (b) a list of fixed location network access points based on the observation data that has been filtered based on the repository of mobile apparatus identifiers.

9. The method of claim 8, further comprising, prior to providing the identifier communication, determining that the mobile apparatus is mobile.

10. The method of claim 9, wherein determining that the mobile apparatus is mobile comprises:
    accessing, from the memory of the mobile apparatus, model information corresponding to the mobile apparatus; and
    determining that the model information corresponds to an apparatus that is mobile.

11. The method of claim 10, wherein determining that the model information corresponds to an apparatus that is mobile comprises comparing at least a portion of the model information to a model information repository.

12. The method of claim 9, wherein determining that the mobile apparatus is mobile comprises analyzing two or more locations of the mobile apparatus and determining that the two or more locations satisfy a threshold distance criteria.

13. An apparatus comprising at least one processor, at least one memory storing computer program code and/or instructions, and a display, the at least one memory and the computer program code is configured to, with the processor, cause the apparatus to at least:
    capture observation data, the observation data including one or more network interface identifiers of observed radio network access points;
    obtain a repository of mobile apparatus identifiers;
    filter the observation data based on the repository of mobile apparatus identifiers;
    update a map based on filtered observations generated by filtering the observation data, wherein the map is a radio map comprising a plurality of access point models and the filtered observation data includes observation data corresponding to one or more fixed location access points; and
    cause display of at least one of (a) a list of mobile network access points or (b) a list of fixed location network access points based on the observation data that has been filtered based on the repository of mobile apparatus identifiers.

14. The apparatus of claim 13, further comprising a display and wherein the at least one memory and the computer program code is configured to, with the processor, cause the apparatus to at least cause display of a list of available wireless network access points based at least in part on the observation data that has been filtered based on the repository of mobile apparatus identifiers.

* * * * *